INTELLIGENCE COMMUNICATION SYSTEM

Filed June 23, 1958 3 Sheets-Sheet 1

INVENTOR.
HAROLD G. MARKEY
BY
Richard C. Cummins
ATTORNEY

April 30, 1963 H. G. MARKEY 3,088,069

INTELLIGENCE COMMUNICATION SYSTEM

Filed June 23, 1958 3 Sheets-Sheet 3

3,088,069

INTELLIGENCE COMMUNICATION SYSTEM

Harold G. Markey, San Jose, Calif., assignor to International Business Machines Corporation, New York, N.Y., a corporation of New York Filed June 23, 1958, Ser. No. 743,576
1 Claim. (Cl. 325—49)

This application is a continuation-in-part of copending application Serial No. 740,638, filed June 9, 1958, and now abandoned. This invention relates in general to communication systems and in particular to a communication system employing supressed carrier type signal transmission.

In suppressed carrier transmission systems a signal corresponding to the information to be transmitted is employed at the transmitter to modulate a carrier signal having a preassigned frequency determined by the particular type of communication channel being used. Generally a balanced modulator is employed to modulate the carrier, producing upper and lower sideband signals which contain the information and supressing the original carrier signal. The advantage of suppressed carrier transmission is that for a transmitter having a fixed power rating more power is made available to transmit the sideband signals containing the information. In some systems one sideband is completely or partially suppressed to reduce the bandwidth of the transmitted signal.

While suppressed carrier transmission systems have the advantage that the power available at the transmitter is used most efficiently, a disadvantage exists in the sense that a carrier signal must be generated at the receiver in order to detect the received signal. This is true for both single and double sideband suppressed carrier systems. In order to detect such signals accurately, the frequency of the carrier generated locally at the receiver must have a definite relationship with the received signal, which corresponds exactly with the relationship between the carrier generated at the transmitter and the transmitted signal. That is, the difference in frequency between the carrier generated at the receiver and the received signal must be the same as the difference in frequency between the carrier generated at the transmitter and the transmitted signal.

This difference frequency may vary slightly where voice signals transmitted by single sideband transmission are being detected. However, in the transmission of voice signals by double sideband transmission, the relationships must be maintained. Likewise, when digital data signals are to be transmitted by either single or double sideband transmission, the difference frequencies must correspond exactly since the carrier generated at the receiver is used as a reference signal to determine the significance of informational bits contained in the received signal.

In some information transmitting systems a communication channel is employed which causes a shift in the frequency spectrum of the transmitted signal. A telephone network is one example of this type of communication channel. In such systems the problem of generating a carrier signal so as to maintain the correct relationship at the receiver corresponding to the relationship established at the transmitter and continually modified by the communication channel becomes quite complicated.

The prior art has suggested various arrangements directed to the problem of generating a carrier signal at the receiver having a frequency relationship with the received signal corresponding exactly with the relationship established at the transmitter. Many of these suggested arrangements involve rather intricate and complicated control systems for varying a local oscillator at the receiver and hence are not generally acceptable because of their complexity and relatively high cost.

In copending application Serial No. 715,976, filed February 18, 1958, now Patent No. 2,979,566, there is disclosed a system for transmitting digital data at comparatively high speeds over a communication channel employing single sideband suppressed carrier transmission. In that system a subcarrier signal, modulated in accordance with the data signal, was transmitted simultaneously with a pilot signal to a data receiver through a telephone network, and the receiver demodulated the received signal by a continuous subcarrier or reference signal generated within the receiver. The reference signal was generated by delaying the received modulated subcarrier signal for one bit time and modulating it with the corresponding bit of the output informational signal. The output informational signal was obtained by integrating the output signal of the synchronous detector and squelching the integrated signal at times corresponding to the bit rate frequency. Since the reference signal is generated directly from the received signal, the correct relationship necessary for reliable detection is always maintained.

In the system disclosed by the above mentioned copending application it was necessary also to generate a clocking signal at the receiver to control the squelching of the integrated signal in order to obtain the proper timing relation between the output informational signal and the delayed modulated signal. The pilot signal, transmitted simultaneously with the modulated subcarrier, was employed in the generation of the clock signal and hence was required for substantially error-free operation of the system.

The above described system may be classified in accordance with the present-day standards as a relatively high-speed data transmission system since it is capable of substantially error-free operation in the range of 1600 bits/sec.

There are, of course, many data processing applications in which such speeds are desirable and the above described system is extremely advantageous because of its error-free operation, relative simplicity and low cost. However, many data processing applications do not require such speed, a prime example being a typewriter located at a remote inquiry station for supplying data to a centrally located computer. In such applications simplicity, cost and error-free transmission are the main considerations, while the speed of transmission is only of minor importance. While the reliability of the system disclosed in the above mentioned copending application increases even still further as the data transmission speed is lowered, the cost of this system increases since the received signal must be delayed for a longer bit interval. This increases the cost of the one-bit delay unit and hence the system is more advantageously employed in connection with high-speed data transmission.

The present invention is an improvement over the system disclosed in the above mentioned copending application in the sense that it provides a relatively simpler, lower-cost, adjustable speed, substantially error-free intelligence transmission system which is also operable to detect voice type signals from a suppressed carrier type transmitting system and also operable to detect signals transmitted by some carrier type transmission systems. The need for a local oscillator as suggested by the prior art and the requirement of an internally generated clock signal at the receiver as suggested in the above mentioned copending application have been eliminated. It has been found in accordance with the present invention that a communication system adapted to transmit by suppressed carrier transmission a signal amplitude modulated with an intelligence signal may be provided with a receiver which regenerates a continuous carrier signal directly from the received signal by demodulating it with a signal obtained from the output of the receiver. The system is readily adapted to the transmission of digital data information at various speeds through telephone networks because of the extreme accuracy at which the frequency relationship between the regenerated carrier signal and the received signal is maintained independently of a frequency spectrum shift.

It is therefore an object of the present invention to provide an improved intelligence transmission system.

A further object of the present invention is to provide a simple, low-cost receiver adapted to detect signals from a suppressed carrier transmitter.

A still further object of the present invention is to provide a receiver for a suppressed carrier communication system in which a continuous carrier signal is regenerated at the receiver directly from the received signal.

A still further object of the present invention is to provide a relatively simple, low-cost apparatus for receiving or detecting digital data signals transmitted by a double sideband suppressed carrier transmitter.

Other objects of the invention will be pointed out in the following description and claims and illustrated in the accompanying drawings which disclose, by way of example, the principle of the invention and the best mode which has been contemplated of applying that principle.

Figure 2:
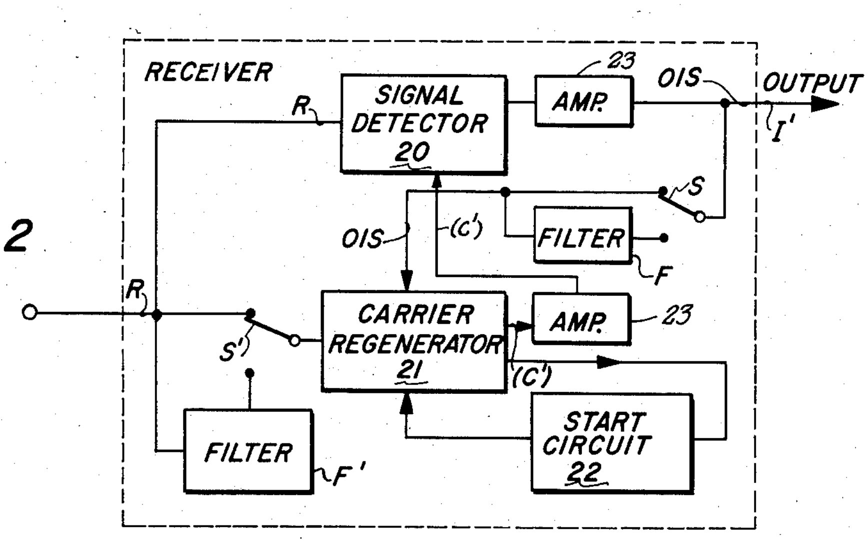
FIG. 2 is a block diagram illustrating the receiver of a communication system embodying the present invention.
Figures 2A, 4, 5C:
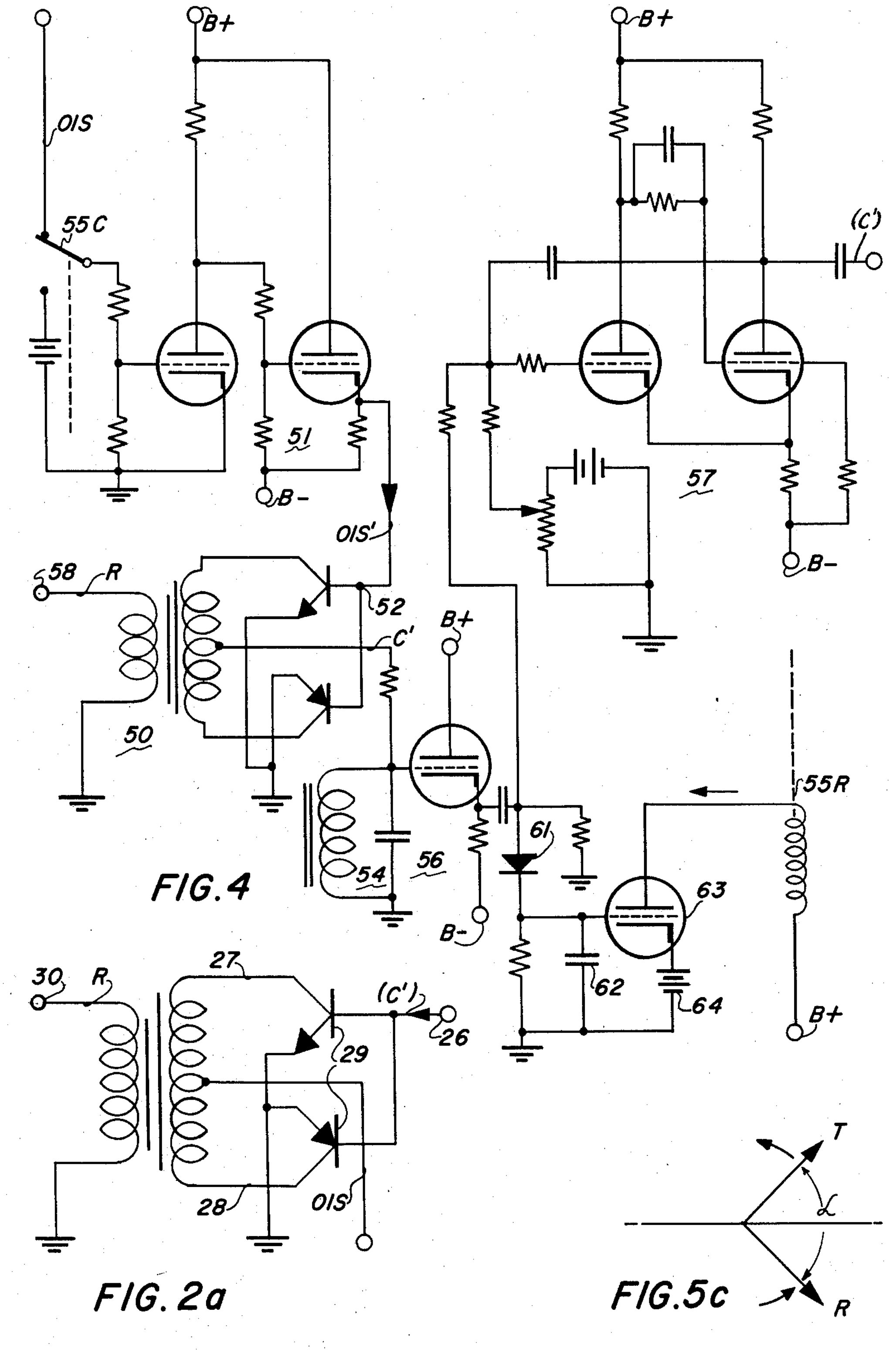

FIG. 2*a* is a schematic diagram of the signal detector shown in block form in FIG. 2.

Figure 3:
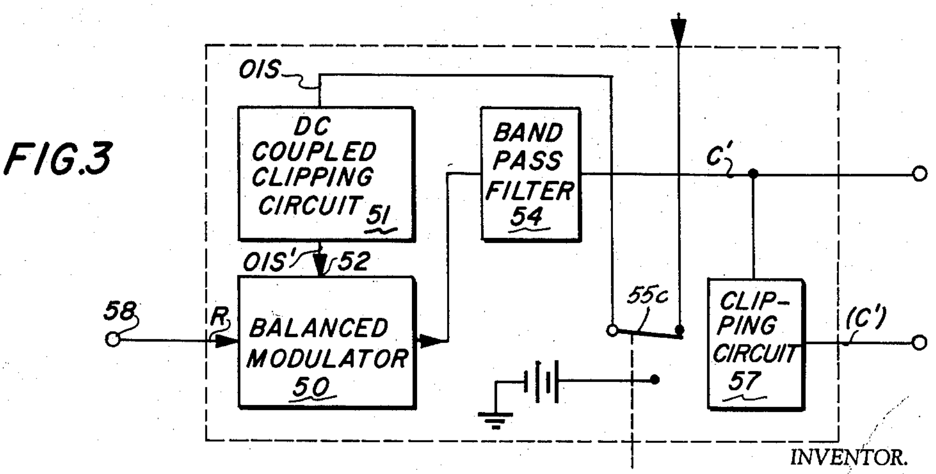

FIG. 3 is a diagrammatic view of the carrier regenerator shown in block form in FIG. 2.

FIG. 4 is a schematic view of the carrier regenerator and start circuit shown in FIG. 3.

Figure 1:
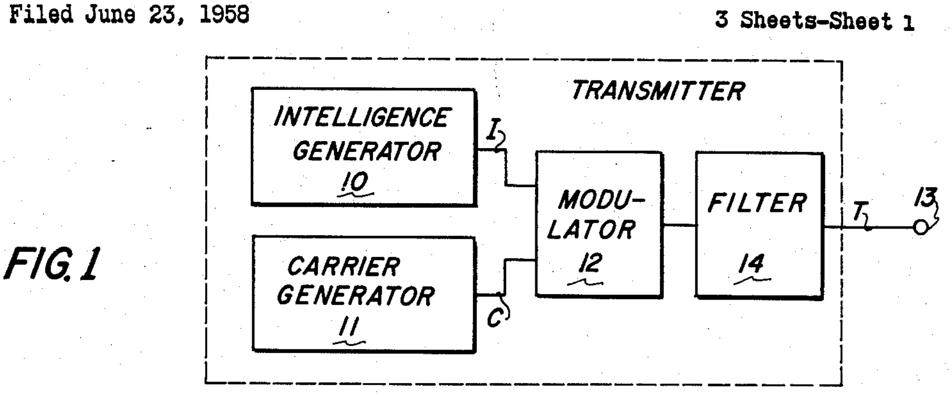
FIG. 1 is a block diagram illustrating the transmitter of a communication system embodying the present invention.
Figures 5A, 5B:
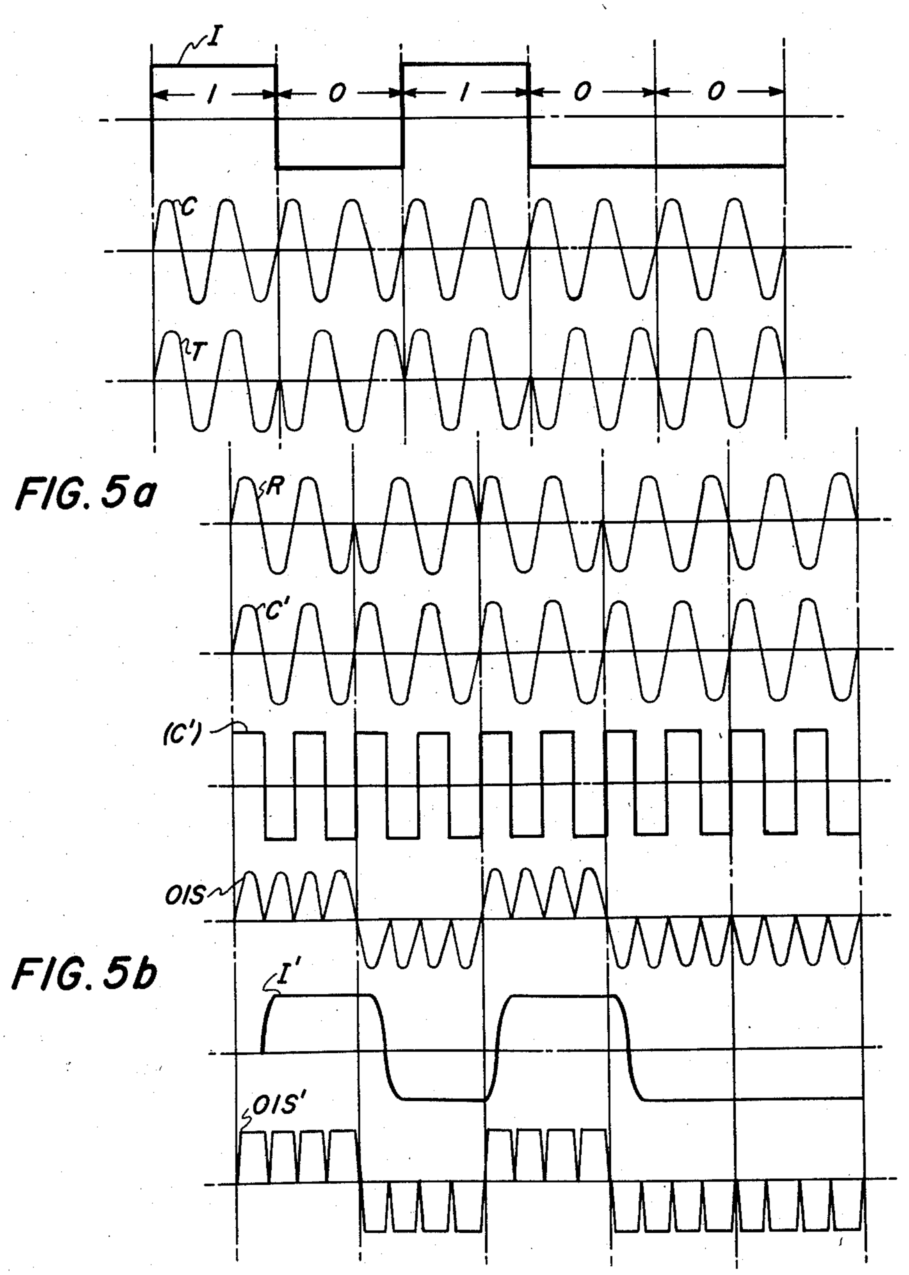

FIGS. 5*a* through 5*c* are graphs illustrating various waveforms generated by the carrier system shown in FIGS. 1 and 2.

Referring to the drawings and particularly to FIG. 1, a double sideband suppressed carrier transmitter is illustrated in block form as comprising an intelligence signal generator 10, a carrier signal generator 11, a balanced modulator 12 connected to an output terminal 13 of the transmitter through a suitable bandpass filter 14. The type of transmitter shown in block form in FIG. 1 is well known in the art and hence the details of the transmitter are not shown. The transmitter functions to transmit upper and lower sideband signals obtained in modulator 12 by modulating the carrier signal provided by generator 11 with the signal developed by the intelligence signal generator 10. It is assumed for purposes of explanation that the intelligence signal is a binary coded pulse signal representing digital data, and in this regard the intelligence signal generator designated by block 10 may be any suitable device known in the art, e.g., a magnetic type information storage file, and in practice may be located remotely from the actual transmitter.

The signals generated by the transmitter are shown in FIG. 5*a*. The signal designated I represents the intelligence signal, that designated C represents the carrier signal, and that designated T represents the transmitted signal which is supplied to the communication channel (not shown) through the bandpass filter 14. Bandpass filter 14 functions to eliminate modulation products not in the upper and lower sideband signals.

With reference to FIG. 5*a* it will be noted that digital information is transmitted in terms of 180° phase reversals of the carrier signal. In other words, binary "1" is represented by the transmitted signal T being in phase with the carrier for one bit time, which in this instance is two cycles of the carrier. Binary "0," on the other hand, is represented by the transmitted signal T being 180° out of phase with the carrier signal during one bit time. The transmitted signal therefore appears identical to a carrier signal phase modulated in accordance with a binary coded information signal. For a more detailed discussion of phase modulated systems and double sideband suppressed carrier systems see F. E. Terman, "Electronic and Radio Engineering," McGraw-Hill. Further, it will be noted that the information signal I and carrier signal C as shown, are synchronous. However, it should be understood that they may be non-synchronous without affecting the operation of the system.

The receiver coupled to the output of the communication channel is shown in block form in FIG. 2 and comprises generally a signal detecting means 20, a carrier regenerating means 21, a start circuit 22, and suitable signal amplifiers 23. The received signal designated R in FIG. 5*b* corresponds to the transmitted signal T but is illustrated as being shifted in phase an arbitrary amount as a result of the frequency spectrum shift caused by the communication channel. FIG. 5*c* is a vector diagram illustrating a frequency spectrum shift of $\alpha$ c.p.s. which is caused, for example, by transmitting the signal T through a present-day telephone network. Rotating vectors T and R represent signals T and R in FIGS. 5*a* and 5*b*, and $\alpha$ represents the angular rate between the two vectors corresponding to the amount of frequency spectrum shift. If a communication channel is employed which does not shift the frequency spectrum of the received signal R, it would then be in phase with the transmitted signal T.

The received signal R is supplied simultaneously to the signal detecting means 20 and the carrier regenerating means 21. Signal detecting means 20 comprises a suitable synchronous detector such as a balanced demodulator, an example of which is illustrated in FIG. 2*a*. The operation of the balanced demodulator illustrated in FIG. 2*a* is well known and hence will not be explained in detail. Generally, however, a signal applied to terminal 26, depending on its polarity, connects either terminal 27 or terminal 28 to ground through the appropriate saturated transistor unit 29. The signal applied to the other input terminal 30 is therefore reversed in phase at the instant when the signal applied to terminal 26 goes from a negative to a positive value or vice versa.

If it is assumed for the moment that a continuous carrier signal C′, having a frequency relationship relative to the received signal which is identical with the frequency relationship between the signals C and T of the transmitter, is available at the receiver, the received signal may be readily detected by the synchronous demodulator shown in FIG. 2*a*. The carrier signal C′ may be clipped and applied to terminal 26 while signal R is supplied to the other input terminal 30. The resulting output signal may be represented as seen in FIG. 5*b* by the signal designated OIS. By filtering the signal OIS, an information signal I′ which corresponds to the intelligence signal generated at the transmitter is obtained.

The signal (C′) or, more exactly, the clipped signal C′ supplied to terminal 26 of the signal detector 20 is generated by the carrier regenerating means 21 shown diagrammatically in FIG. 3 and schematically in FIG. 4. The carrier regenerating means 21 comprises a balanced modulator 50 similar to the balanced demodulator shown in FIG. 2*a*, a D.-C. coupled clipping circuit 51 connected between input terminal 52 of modulator 50 and the output terminal of the receiver, a bandpass filter 54 connected through a cathode follower 56 to clipping circuit 57.

The received signal R supplied to terminal 58 of the modulator 50 is modulated by signal OIS obtained directly from the output of the signal detector 20. Signal OIS is supplied to terminal 52 of the modulator through the clipping circuit 51. The clipped output signal is designated OIS′ in FIG. 5*b*. It will be seen by reference to FIG. 5*b* that when the signal OIS′ is modulated with received signal R, the resulting signal C′, which was previously assumed, is obtained. The regenerated carrier signal C′ is supplied to terminal 26 of the balanced modulator of the signal detector 20 through filter 54 and the clipping circuit 57.

The function of filter 54 is to eliminate unwanted modulation products obtained in modulator 50, and hence any noise signals outside the pass band of the filter which are present in the received signal are also filtered out. The regenerated carrier is thus substantially noise free. In addition, filter 54 provides a stabilizing effect on the receiver which eliminates the necessity of sending a new start signal each time the received signal is momentarily interrupted.

Under some operating conditions, such as increased transmitting speed or a limited bandwidth communication channel, the received signal is subject to a certain amount of distortion. By providing the low-pass filter F, selectively connectable to the output of the detector by switches the signal designated OIS in FIG. *5a* is filtered, which renders the receiver less susceptible to errors arising from distortion of the received signal. The filtered signal applied to the carrier regenerator is not shown in FIG. *5a*, but it will be obvious to those skilled in the art that it approaches the waveform designated I′ in FIG. *5b*.

It should also be noted that most present-day, economically constructed filters inherently delay the signal which they are filtering, and hence it may be desirable to provide a suitable delay unit such as a filter between the input terminal of the receiver and the carrier regenerator to provide a compensating delay for the received signal supplied to the carrier regenerator. In this connection filter F′, is arranged to be connected selectively in the input line of the carrier regenerator by switch S′. Both filters F and F′ are shown in block form since various known arrangements may be used, such as a conventional L-C filter. With such an arrangement the receiver is adapted to receive data signals at high speeds merely by switching in filters F and F′.

Where the information transmitted is phase dependent, i.e., where a 180° phase reversal changes the significance of the information as in data transmission, means are provided to establish the correct phase of the regenerated carrier signal supplied to the signal detector. The start circuit 22 functions to provide the correct phase of the regenerated carrier (C′) to the signal detector 20. A start circuit responsive to the transmission of a series of "1" pulses when the receiver is connected initially to the communication channel is shown schematically in FIG. 4.

The start circuit comprises a half-wave rectifier 61 connected to the output of the filter 54, a capacitor 62, a triode tube 63 and a bias voltage source 64 for biasing the cathode of tube 63 slightly positive to cause the tube to be normally cut off. As a result of receiving a series of "1" pulses capacitor 62 is charged to some predetermined value by the action of the half-wave rectifier 61, causing triode 63 to conduct. Relay 55R connected between a positive voltage source and the plate of the triode is energized when the triode is rendered conductive. Energization of the relay 55R operates the contacts 55C of the relay to the position shown in FIG. 4. In the deenergized position of the relay a source of bias voltage is applied to terminal 52 of the modulator 50 through contacts 55C.

The operation of the system for the transmission and reception of voice type signals is identical to that just described in connection with the transmission of data signals except that the start circuit is unnecessary since voice type signals are not phase dependent. It should thus be seen that a receiver constructed in accordance with the present invention is capable of receiving both data and voice type signals.

In some circumstances the frequency of the carrier signal and the spectrum of the intelligence signal may render the provision of a conventional filter 54 uneconomical. However, in such circumstances suitable means may be provided for shifting the frequency spectrum of the received signal to a frequency range where the unwanted modulation products may be eliminated economically by a conventional filter. One well known arrangement for shifting a frequency spectrum involves heterodyning the received signal to provide a signal suitable for the receiver.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

A communication system comprising in combination: a transmitter; a receiver; and a communication channel connected therebetween; said transmitter comprising means for supplying to said channel an information containing signal corresponding to a double sideband suppressed carrier modulated signal; said communication channel including means for translating said information containing signal to said receiver; said receiver comprising a balanced demodulator and a balanced modulator, means for supplying said balanced demodulator and said balanced modulator with said information containing signal as received from said channel, means for supplying said balanced demodulator with a regenerated carrier signal for demodulating said information containing signal to provide an output signal representative of said information, switching means for selectively connecting said output signal to said balanced modulator for modulating said information containing signal to provide said regenerated carrier signal, and synchronizing means for establishing phase agreement between said regenerated carrier signal and said information containing signal, said synchronizing means including an integrating circuit, rectifying means coupling said balanced modulator to said integrating means, and switch activating means responsive to a predetermined integration value for operating said switching means to connect said output signal balanced modulator in response thereto.

References Cited in the file of this patent

UNITED STATES PATENTS

| | | |
|---|---|---|
| 1,559,642 | Nyquist | Nov. 3, 1925 |
| 2,108,117 | Gardere et al. | Feb. 15, 1938 |
| 2,538,266 | Pierce | Jan. 16, 1951 |
| 2,623,169 | Gardere | Dec. 23, 1952 |

FOREIGN PATENTS

| | | |
|---|---|---|
| 164,788 | Japan | 1944 |

OTHER REFERENCES

"Bell System Technical Journal," vol. 27, pp. 1–43 and 44 to 57, January 1948.

Kahn: "Method of Combining Two Frequencies," Proc. IRE, January 1960 (pages 118—119 relied on).

Van Nostrand: The International Dictionary of Physics and Electronics, Second Edition, page 315.